Sept. 26, 1967                A. T. PIERCE                3,343,271
          APPARATUS AND METHOD FOR CURING GRASS INTO HAY
Filed Oct. 4, 1965                                5 Sheets-Sheet 1

Alfred T. Pierce INVENTOR

BY Stowell & Stowell

ATTORNEY

Sept. 26, 1967  A. T. PIERCE  3,343,271
APPARATUS AND METHOD FOR CURING GRASS INTO HAY
Filed Oct. 4, 1965  5 Sheets-Sheet 2

INVENTOR
Alfred T. Pierce

BY Stowell & Stowell

ATTORNEY

Alfred T. Pierce  INVENTOR

BY Stowell & Stowell

ATTORNEY

Sept. 26, 1967     A. T. PIERCE     3,343,271
APPARATUS AND METHOD FOR CURING GRASS INTO HAY Filed Oct. 4, 1965     5 Sheets-Sheet 4

Alfred T. Pierce INVENTOR

BY Stowell & Stowell

ATTORNEY

Sept. 26, 1967 A. T. PIERCE 3,343,271
APPARATUS AND METHOD FOR CURING GRASS INTO HAY
Filed Oct. 4, 1965 5 Sheets-Sheet 5
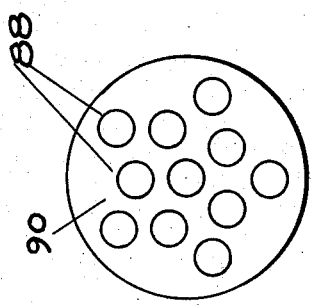
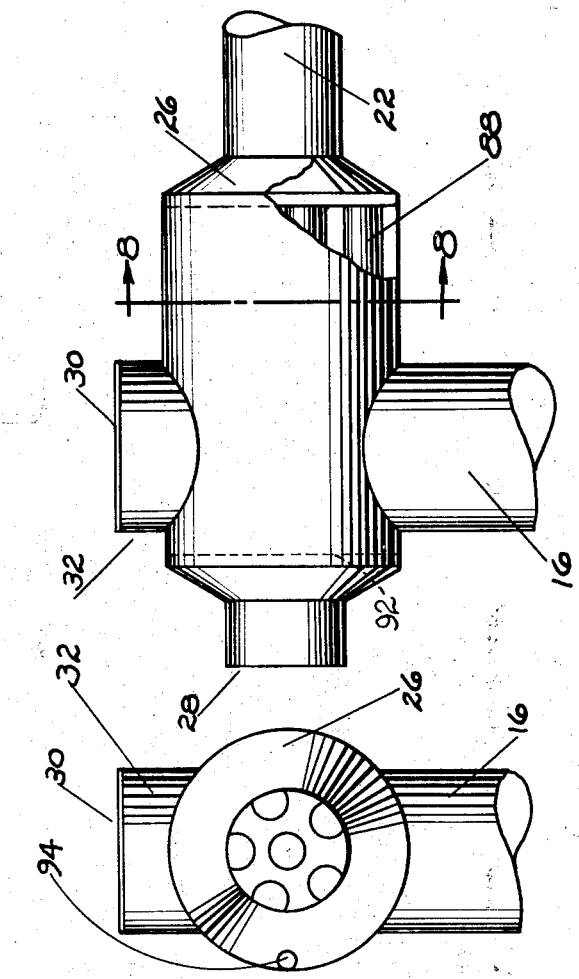
Alfred T. Pierce INVENTOR
BY Stowell & Stowell
ATTORNEY United States Patent Office 3,343,271
Patented Sept. 26, 1967

3,343,271
APPARATUS AND METHOD FOR CURING
GRASS INTO HAY
Alfred T. Pierce, 9½ Bond St.,
Claremont, N.H. 03743
Filed Oct. 4, 1965, Ser. No. 492,659
3 Claims. (Cl. 34—33)

ABSTRACT OF THE DISCLOSURE

Apparatus and the method for drying freshly cut green wet forage crops into a dry hay fodder are disclosed. Wet grasses enter the near end of a portable heat treatment tunnel on an endless perforate table conveyor belt; heated air is fan forced into a manifold underlying the traveling table; moisture-laden air is exhausted from above by a second fan; and the dry hay product emerges from the far end of the tunnel. A condenser/heat-exchanger removes moisture from the exhaust air before final discharge to the atmosphere, while serving to preheat the input air.

---

This invention relates to an apparatus and method for curing freshly mowed green grass into hay. As used throughout the specification and claims, the term "hay" denotes a dried product of grasses and other forage plants which have been cut and cured for fodder. Further, the term "grasses" includes grasses of all types including millet and other small seeded cereal and forage grasses, sudan, timothy, clover, alfalfa, and certain green grain crops.

The apparatus of this invention converts freshly mowed green grasses into hay by the application thereto of heated air of a predetermined temperature at a predetermined rate of flow, and for a particular period of time.

The present invention provides hay curing apparatus employing an elongated heat treatment drying tunnel, through which freshly cut wet grasses, or partially field-cured clover and alfalfa, for example, are passed on an endless conveyor table through the treatment tunnel. Heated air, supplied from a portable gas or oil fired heater is forced by a fan included in the heater at a particular rate of flow through the layer of grass upon the traveling table. The moisture extracted by the heated air from the grass is exhausted from the heater tunnel by means of an exhaust fan. The moisture content of freshly cut green grass may run as great as 60% or higher. To cure such grass and produce a desired dry hay, a corresponding high percentage of moisture is extracted, requiring an exhaust fan of generous proportions. The moisture-laden exhaust air is passed through a condenser. Such condenser is provided with the usual drain for water runoff. The condenser serves an additional purpose in that it is an air-cooled heat exchange device, and the intake air to the heater unit is used as the cooling air for the condensing action. This provides an additional advantage in that the intake air is thus preheated, which results in a reduction in the fuel requirements for the heater, and further insures that the intake air will be of low moisture content.

An important advantage provided by the present invention is that the hay curing apparatus may be in the form of a portable dryer. It may be placed upon wheels and may be moved from field to field, or from farm to farm.

It is an object of the present invention to provide an apparatus and method for the continuous curing of freshly mowed green grass into a hay product of superior quality.

A further object of the present invention is to provide a portable hay curing apparatus which is readily transportable from field to field.

Another object of the present invention is to provide a hay curing apparatus and method which is economical in cost, both as to first construction, and to continued operation.

Figure 1:
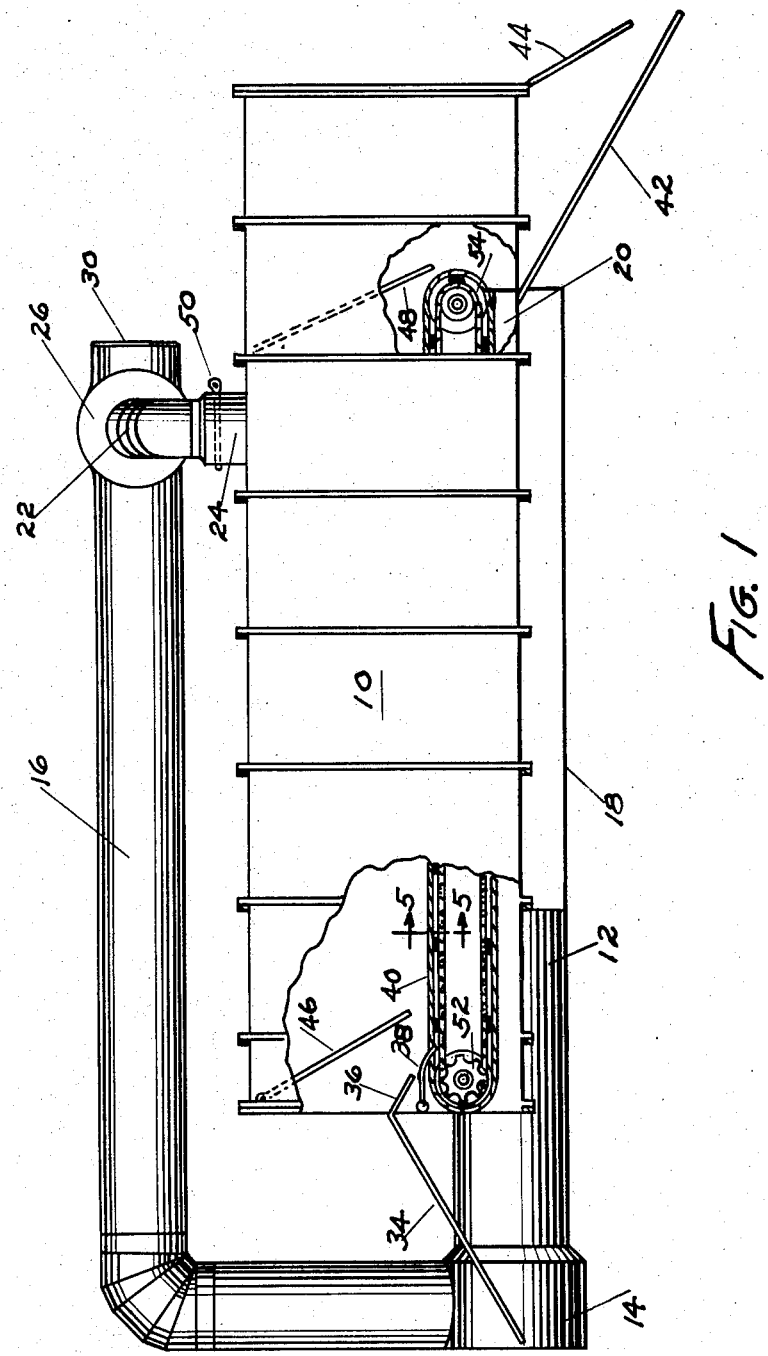
Figure 2:
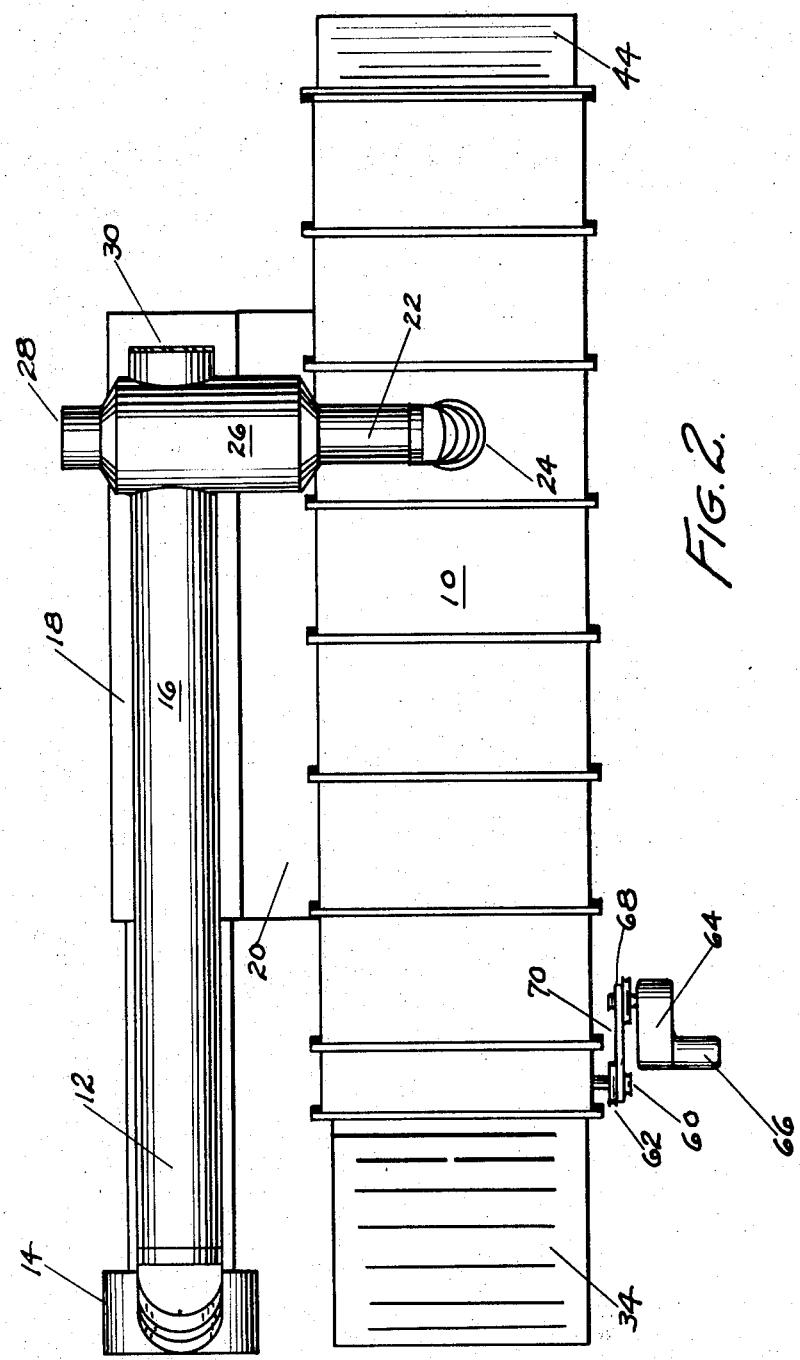
Figure 3:
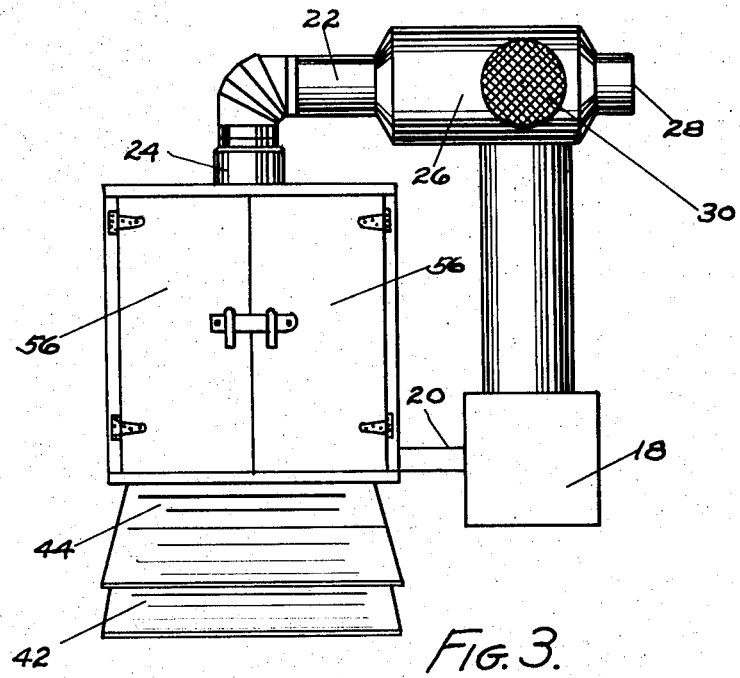
Figure 4:
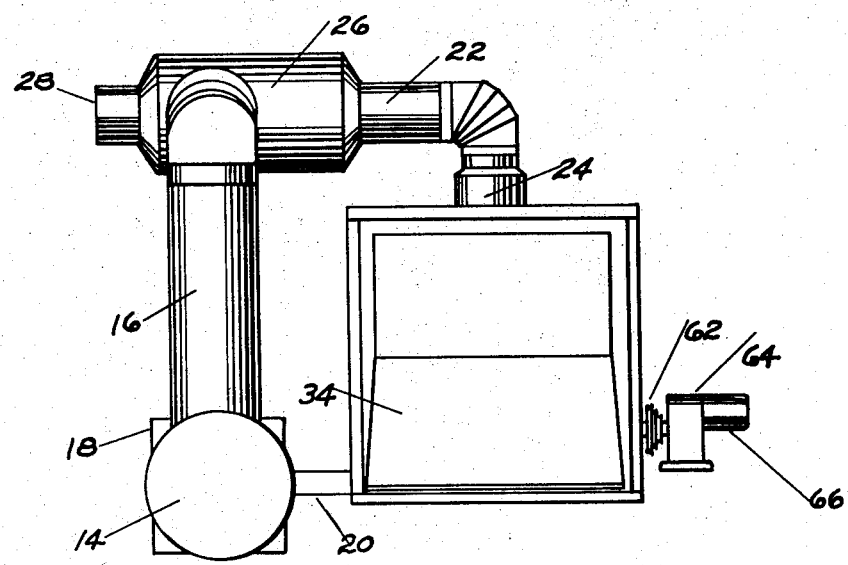
Figure 5:
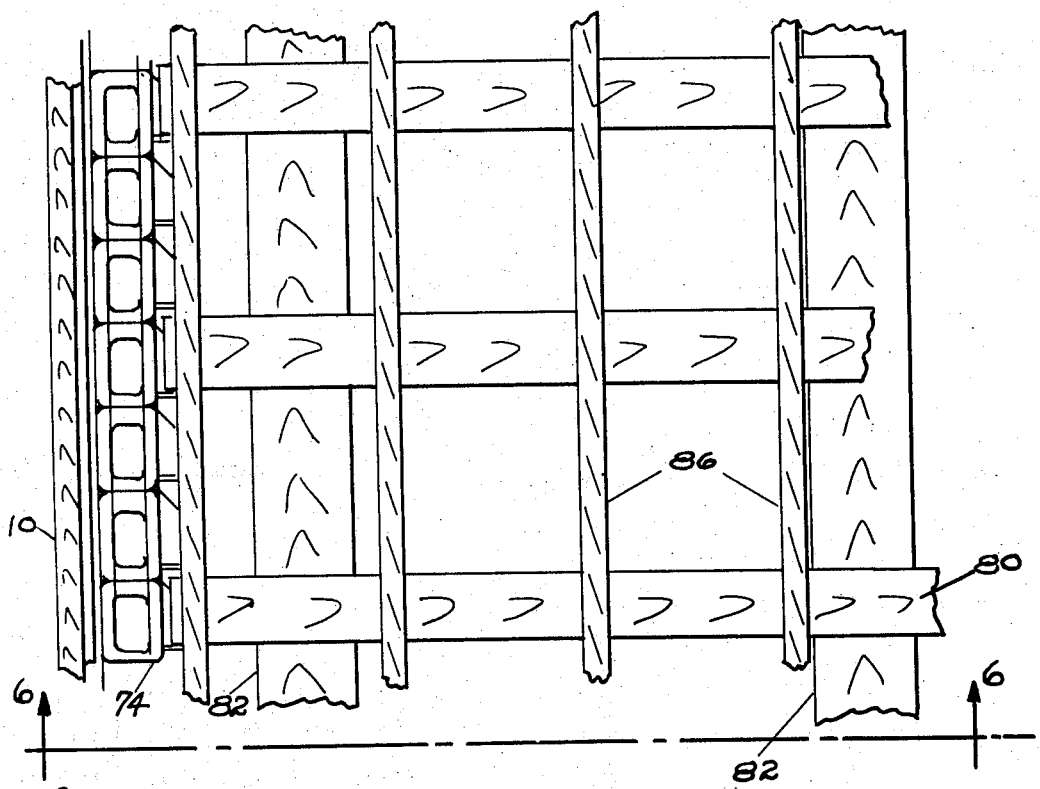
Figure 6:
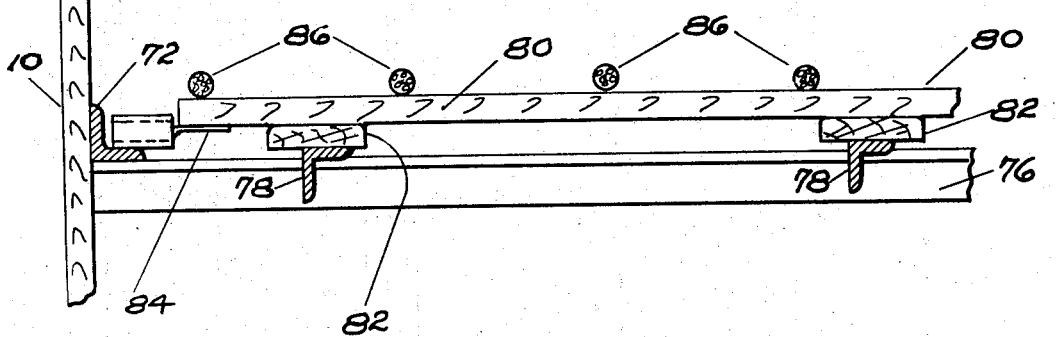

The above and further objects and advantages of the present invention will become apparent upon consideration of the following detailed description thereof when taken together with the accompanying drawings wherein:

FIGURE 1 is a side elevational view of the hay curing apparatus in which certain portions have been cut away to illustrate, in section, certain constructional details;

FIGURE 2, FIGURE 3, and FIGURE 4 are a top plan view, a rear elevation, and a front elevation, respectively, of the hay curing apparatus illustrated in FIG. 1;

FIGURES 5 and 6 are enlarged fragmentary views, not to scale, illustrating certain structural details of the traveling table conveyor belt assembly, wherein FIGURE 5 is a fragmentary top plan view, and FIGURE 6 is a corresponding elevation view taken along the line 6—6 of FIGURE 5; and FIGURES 7, 8 and 9 are to an enlarged scale, and illustrate details of a portion of the condenser and air intake system employed in the hay curing apparatus shown in FIGURE 1, FIGURE 8 being a sectional view taken along the line 8—8 of FIGURE 7.

As shown in FIGURES 1–4, a curing and drying chamber 10 is provided having a generally square cross section, which drying chamber is in the form of an elongated tunnel through which the grass may be passed for treatment and curing into hay. A heater 12 which includes an intake fan unit 14 receives an input supply of air through the pipe or duct 16.

Heated air leaving the heater 12 enters a hot air manifold 18 which runs parallel to the drying tunnel 10. As best illustrated in FIGURES 3 and 4, from manifold 18 the heated air is passed through a narrow rectangular duct 20 to enter the drying tunnel. The duct 20 feeds the heated air beneath a traveling table 40 upon which the grasses are carried. The hot air then passes upward in a general vertical direction as viewed in FIGURE 1 through the wet grass and extracts the moisture from the grasses. The moisture-laden air passes into an exhaust pipe 22, at the base of which an exhaust fan 24 is located. The exhaust pipe is connected to a condenser element 26, and the exhaust air passes through such condenser, wherein a certain amount of its moisture is removed, and the air is finally discharged at an exhaust termination 28.

Within the condenser means 26 the moisture-laden air is cooled to remove all, or a portion, of the water therein. This is effected by means of the input air drawn into the heater 12 by means of its fan 14 through the duct or pipe 16. Air is drawn into the condenser 26 through the short duct 32 to cause a flow over the condensing elements. A screen or filter 30 is provided at the entrance of duct 32 to prevent the entry of foreign material into the heater.

Wet grasses are introduced into the drying tunnel by means of a sloping feed board 34 having an extension 36, and are received upon the traveling conveyor table which is indicated generally by the reference numeral 40. A curved shield 38 is provided between the feed board extension 36 and the conveyor table in order to prevent the grasses from falling into the gearing of the conveyor table. The grasses pass through the dryer tunnel and are subjected to treatment by a flow of hot air up through the conveyor table, which table normally moves at a speed of slightly greater than 1 ft. per minute. By the time the material has reached the far end of the drying tunnel sufficient moisture has been removed from it to produce a high quality hay. The hay is discharged from the conveyor 40 and is permitted to slide off an angled discharge platform 42. A hinged door 44 is provided to regulate the flow of the hay off of the discharge platform 42. To minimize the losses of hot air from the dryer tunnel, sealing curtains 46 and 48 are suspended above the feed end and discharge end of the tunnel, respectively. Such curtains may be formed of a canvas material or the like which will flex and yield so as to permit the entry of the grasses and the discharge of the dried hay.

A pair of wire screens, lying closely adjacent to one another, are located within the housing for the exhaust fan 24. Their purpose is to prevent any dry hay from passing into the exhaust system and condenser means. Such screens are provided with access handles 50 in order that one screen may be pulled out and cleaned while one remains in place within the exhaust fan housing.

The traveling conveyor table is supported at the tunnel entrance end, and is driven by, a pair of sprocket wheels 52. At the far or discharge end of the drying tunnel a pair of smooth-faced wheels 54 supports the conveyor table and permits it to return in an endless fashion while minimizing the adhesion of the dried hay to the returning table. A pair of doors 56 at the discharge end of the tunnel may be opened for periodic inspection and the removal of any accumulation of hay.

The paired sprocket wheels 52 are located in spaced relation, each closely adjacent to a side wall of the drying tunnel, and are carried by and supported on a power drive shaft 60. Shaft 60 is journaled in the walls of the drying tunnel and extends through one wall thereof and is provided with a set of stepped driven pulleys 62 attached to such projecting end. A reduction gear housing 64 is provided having an input drive means 66 attached at one end and a set of stepped pulleys 68 at the other. One of the drive pulleys 68 is connected to a driven pulley 62 by means of interconnecting belt element 70. By means of the stepped drive and driven pulleys it is possible to vary the rate of travel of the conveyor table through the dryer tunnel. This provides a necessary factor in the curing of the grasses, dependent upon their moisture content or type. For example, freshly mowed grass may have a very high moisture content and the rate of conveyor travel should be slowed accordingly. While other crops, such as partially field cured clover or alfalfa may be dried and properly cured without the loss of their leaves by increasing the speed of travel of the conveyor table.

The upper surface of the traveling conveyor which carries the grasses in their passage through the tunnel is supported from below by a grid-like arrangement which is best seen in the fragmentary view of FIGURE 6. A longitudinal support member 72 is attached to each side wall of the tunnel 10 by any suitable fastening, not shown, at a suitable height to support the traveling table and its chain drive means 74. Each longitudinal member 72 extends for nearly the full length of travel of the table 40, and the upper surface provides a support for the chain links. The ends of a series of transverse angle iron members 76 are attached at spaced points to the underside of each of the longitudinal elements 72. A series of longitudinal angle irons 78 are attached at spaced intervals to the transverse angle irons 76 by means of bolts, or welding, or other suitable means. The top surfaces of the longitudinal angle irons 78 should be at the same, or at a slightly greater, height than the top surface of any transverse member 76. The attaching method employed between members 76 and 78 should be such that there are no projections above the upper surface of element 78. At the intersecting points of the resultant angle iron grid suitable relief cuts may be made in the web sections as necessary and thereafter reenforced, in a manner well known in the art.

The upper surfaces of the longitudinal angle iron elements 78 form a skid upon which the wood crossbars 80 which support the grasses may ride directly, or, as shown, upon the upper surface of an intervening wooden wear member 82 which extends longitudinally the length of the drying table within the tunnel. Crossbars 80 are attached at spaced intervals to the lug portions 84 which protrude inwardly from the chain lengths 74. A series of closely spaced longitudinal rope loop members 86 are attached at regular intervals to successive crossbar by any appropriate means, not shown, such as by stapling. The ropes 86, together with the crossbars 80, form a flexible grid which supports the grasses and carries them through the length of the tunnel, while providing the necessary openings through which the hot air is passed upwardly through the grasses.

FIGURE 7 shows, to an enlarged scale, details of the condenser means 26 and its interconnection with the exhaust pipe 22 and the air intake pipe 16. A plurality of tubes 88 are carried by and supported in a pair of header plates 90 and 92 located within the housing of the condenser means. The total cross-sectional area of the tubes 88 should be equal to or greater than the cross-sectional area of the exhaust pipe 22. The attachment of the tubes 88 to the plates 90 and 92 must be airtight, and the attachments of the plates, in turn, should be an airtight one with the inner wall of the condenser housing. Intake air for the dryer enters through the screened opening 30, passes around the outer surfaces of the tubes 88 and then enters the duct 16. In this manner, the intake air serves to cool and condense the moisture-laden exhaust air; while at the same time, the intake air is pre-heated so as to reduce the fuel requirements of the heater unit. The condensate is permitted to fall by gravity from the small exit hole 94 which is located at the bottom of the body of the condenser means 26 at the exhaust termination 28, and is visible in the end elevation view of FIGURE 9.

By way of illustration, a preferred embodiment of the hay dryer according to this invention may be constructed as follows:

Dryer tunnel 10 may be formed from sheets of 4′ x 8′ x ¾″ moisture resistant plywood nailed to a supporting framework consisting of wooden studs 94 as shown in FIGURE 1. This results in a smooth interior for the tunnel. The overall dimensions are 32′ x 8′ x 8′, while those of the hot air manifold 18 are 22′ x 4′ x 4′, and the interconnecting duct 20 is 20′ long, 2′ wide, and 8″ high.

The traveling conveyor table 40 is supported on 2″ angle iron elements 72 which are 22′ in length. Each transverse grid member 76 may be a 1″ angle iron, and each longitudinal grid element 78 may be a 1″ angle iron or a 1″ x ½″ angle iron section 22′ in length. The spacing of the grid elements 76 and 78 may be approximately 2′ in either direction.

The wood crossbars 80 may be 1″ x 1″ or 2″ x 2″ lumber approximately 7′10″ in length, and the rope loop elements 86 may be ¼″ diameter rope spaced 3″ apart on centers. The spacing of adjacent wood crossbars 80 may be every 18″ at their ends where they are secured to the link belt 74. The longitudinal wood bars 82, when used, should be 22′ in length.

The diameter of the sprocket drive wheels 52 may be 8″ with a corresponding diameter for the idler wheels 54.

The condenser means 26 may be of a general cylindrical shape as illustrated in the drawings, and have a diameter of 3′ and a length of 6′. 24″ diameter duct may be used for the exhaust pipe 22 and 28. A larger diameter duct should be selected for the intake elements 32 and 16; 30–34″ in diameter. The burner selected should deliver 2,100,000 b.t.u. per hour, giving a temperature rise of 180° F.; to which air should be supplied at the rate of 10,500 cubic feet per minute by the fan 14.

Assuming an ambient temperature of 60° F., the resultant heated air would be raised to a total temperature of 240° F. At such temperature, and with the flow rate as defined by the air delivery at the heater intake end as set out above, green wet grass can be cured by the invention in a time period of 20 minutes. With a total conveyor table length of 26′, the feed speed-control pulleys should be selected so that the table will travel at the rate of 1.3 ft. per minute. For the stated table width of 8′ and input air supply of 10,500 cubic feet per minute, heated air is supplied at a flow rate of substantially 50 cubic feet per minute per each square foot of the conveyor table. With semi-dried grasses, clover and alfalfa, the rate of travel on the conveyor table 40 should be accordingly adjusted as noted before.

While the specification has described a preferred embodiment of the invention, and a specific exemplary construction has been noted immediately above, it will be apparent to those skilled in the art that various changes and modifications may be made without altering the spirit and scope of the invention as defined in the claims. For example, a belt conveyor or other alternative feeder means may be substituted for the sloping feed board 34–36 illustrated in FIGURES 1 and 4.

What is claimed is:

1. In a method for curing green grasses into hay which consists of passing said grasses disposed in a relatively thin layer in a bed through an elongated heat treatment chamber, the improvement which comprises introducing a flow of heated air solely below said bed at a predetermined rate of flow for a predetermined time, wherein said heated air has a temperature of 240° F., and is applied for substantially twenty minutes at a flow rate of substantially fifty cubic feet per minute per square foot of said grass bed; the rate of passage of said bed through the chamber being substantially 1.3 feet per minute.

2. An apparatus for curing green grasses into hay comprising, in combination, an elongated heat treatment tunnel, a perforated conveyor table movable along a path through said tunnel, means to introduce wet grasses disposed in a relatively thin layer into one end of said tunnel, means to remove cured grasses from the other end of said tunnel, and means to supply a volume of heated air solely below said perforated conveyor table at a temperature of 240° F. for substantially twenty minutes at a volume of substantially fifty cubic feet per minute per square foot of said conveyor table; the rate of movement of said table through the tunnel being substantially 1.3 feet per minute.

3. An apparatus for curing green grasses into hay according to claim 2 wherein an exhaust fan is positioned above said perforated conveyor table to draw off moisture-laden gases forced from said wet grasses by the passage of heated air therethrough, and condenser means located beyond said exhaust fan operable to extract moisture from said drawn off gases; said condenser means being a heat-transfer device which pre-heats the volume of air to be supplied below the perforated conveyor table while cooling the drawn off gases.

References Cited

UNITED STATES PATENTS

| | | | |
|---|---|---|---|
| 1,667,428 | 4/1928 | Mason | 34—25 X |
| 2,135,636 | 11/1938 | Fulmer | 34—12 |
| 2,513,480 | 7/1950 | Heth | 263—40 |
| 2,637,121 | 5/1953 | Steere | 34—28 X |
| 2,938,714 | 5/1960 | Gerrish | 34—86 X |

KENNETH W. SPRAGUE, *Primary Examiner.*